US011272579B2

(12) United States Patent
Abukawa et al.

(10) Patent No.: US 11,272,579 B2
(45) Date of Patent: Mar. 8, 2022

(54) HEAT GENERATING COMPONENT

(71) Applicant: TOCALO CO., LTD., Kobe (JP)

(72) Inventors: Shikou Abukawa, Akashi (JP); Kensuke Taguchi, Akashi (JP); Toru Moriyama, Akashi (JP); Yasuhiro Sato, Akashi (JP); Akira Kumagai, Akashi (JP); Yu Asakimori, Akashi (JP)

(73) Assignee: TOCALO CO., LTD., Kobe (JP)

( * ) Notice: Subject to any disclaimer, the term of this patent is extended or adjusted under 35 U.S.C. 154(b) by 510 days.

(21) Appl. No.: 16/310,797

(22) PCT Filed: Jun. 2, 2017

(86) PCT No.: PCT/JP2017/020545
§ 371 (c)(1),
(2) Date: Dec. 17, 2018

(87) PCT Pub. No.: WO2017/217251
PCT Pub. Date: Dec. 21, 2017

(65) Prior Publication Data

US 2019/0327790 A1 Oct. 24, 2019

(30) Foreign Application Priority Data

Jun. 17, 2016 (JP) ............................ JP2016-120806

(51) Int. Cl.
*H05B 3/14* (2006.01)
*H05B 3/26* (2006.01)
(Continued)

(52) U.S. Cl.
CPC ............... *H05B 3/283* (2013.01); *H05B 3/12* (2013.01); *H05B 3/141* (2013.01); *H05B 3/265* (2013.01); *H05B 2203/013* (2013.01)

(58) Field of Classification Search
None
See application file for complete search history.

(56) References Cited

U.S. PATENT DOCUMENTS 4,194,022 A * 3/1980 Gillery .................... C03C 17/36 427/109
4,422,917 A * 12/1983 Hayfield ................ C25B 11/04 204/196.01
(Continued)

FOREIGN PATENT DOCUMENTS

CN 1296724 5/2001
CN 102858706 1/2013
(Continued)

OTHER PUBLICATIONS

JPS 59-094394, May 1984, Kojima Yoshikusa, partial translation. (Year: 1984).*
(Continued)

*Primary Examiner* — Joseph M. Pelham
(74) *Attorney, Agent, or Firm* — Knobbe, Martens, Olson & Bear LLP

(57) ABSTRACT

Provided is a heat generating component of which volume resistivity hardly varies even if used repeatedly at a high temperature for a long period of time. Since a thin coating heater part (13) formed on a substrate part (12) is composed of a thermal sprayed coating containing $Ti_xO_y$ (wherein, 0<y/x<2.0 is satisfied), obtained is a heat generating component (11) having volume resistivity which is suitable for a heater and hardly varies even if prescribed temperature change and temperature keeping are repeated.

6 Claims, 11 Drawing Sheets

(51) Int. Cl.

| | |
|---|---|
| ***H05B 3/28*** | (2006.01) |
| ***H05B 3/20*** | (2006.01) |
| ***H05B 3/74*** | (2006.01) |
| ***H05B 3/12*** | (2006.01) |

(56) References Cited

U.S. PATENT DOCUMENTS

| | | | | |
|---|---|---|---|---|
| 4,912,286 | A | 3/1990 | Clarke | |
| 5,909,354 | A | 6/1999 | Harada et al. | |
| 2009/0178764 | A1 | 7/2009 | Kanno et al. | |
| 2011/0262757 | A1 | 10/2011 | Lu et al. | |
| 2014/0026815 | A1* | 1/2014 | Mathiasson | C23C 14/243 118/726 |
| 2015/0163863 | A1* | 6/2015 | Wegener | H05B 1/0236 219/202 |
| 2015/0264747 | A1* | 9/2015 | Abbott | F24D 13/02 392/407 |
| 2015/0373783 | A1 | 12/2015 | Kitagawa | |
| 2017/0258268 | A1* | 9/2017 | Kazanas | A47J 37/06 |

FOREIGN PATENT DOCUMENTS

| | | | |
|---|---|---|---|
| EP | 1109423 | | 6/2001 |
| JP | S59-094394 | A | 5/1984 |
| JP | H0969554 | A1 | 3/1997 |
| JP | 2002-043033 | A | 2/2002 |
| JP | 2008-041627 | A | 2/2008 |
| JP | 2009-170509 | A | 7/2009 |
| JP | 2016-027601 | A | 2/2016 |

OTHER PUBLICATIONS

Office Action for Japanese Patent Application No. 2018-523654 dated Sep. 12, 2019.

* cited by examiner

[FIG. 1]
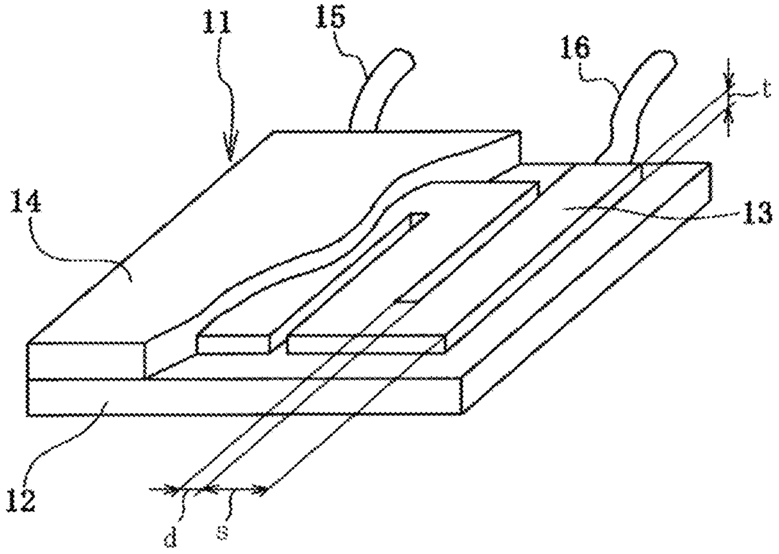

[FIG. 2]
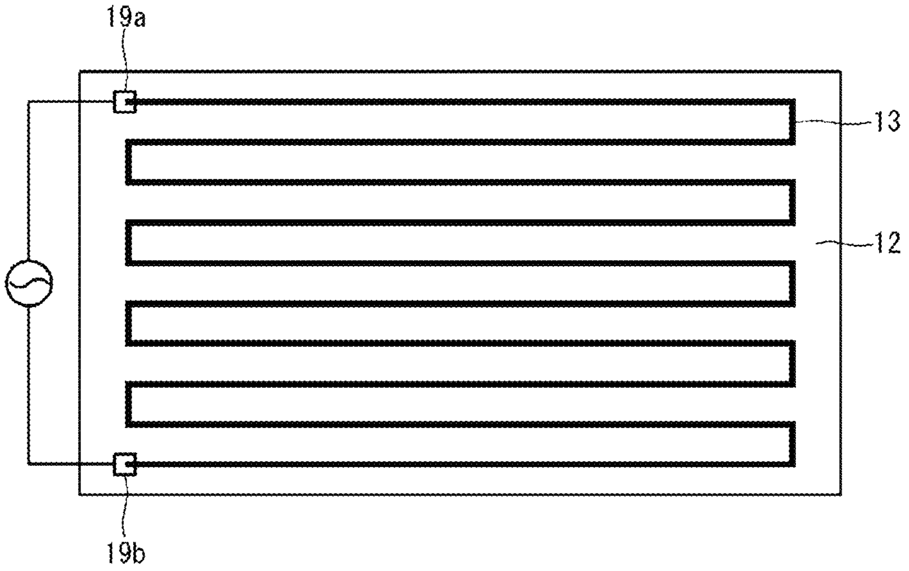

[FIG. 3]
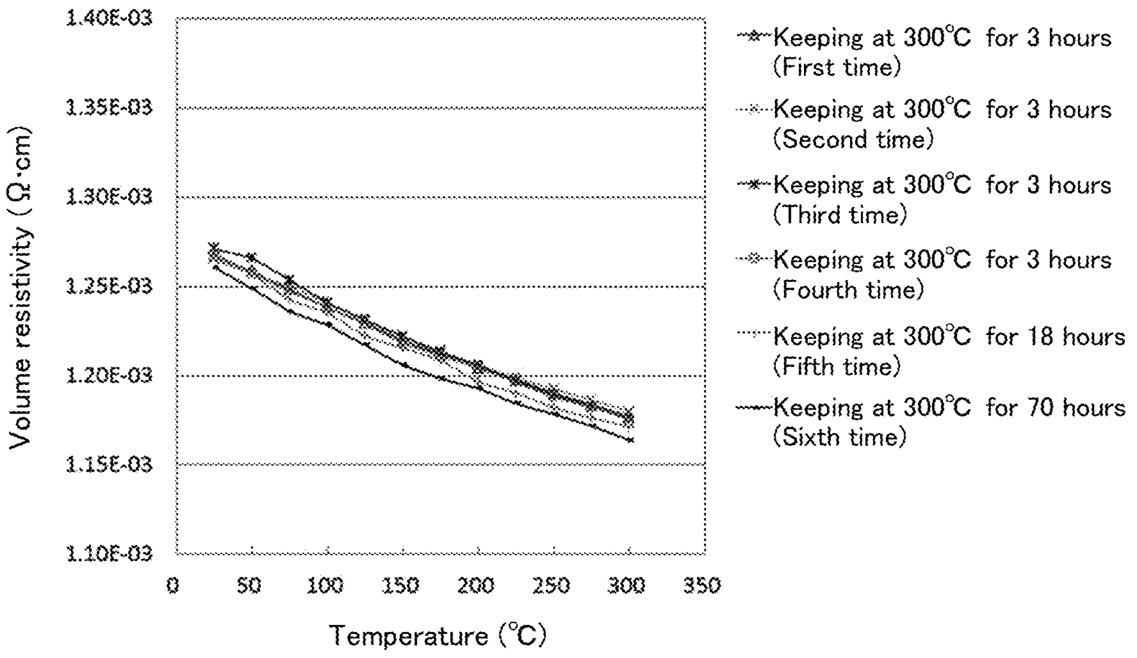

[FIG. 4]
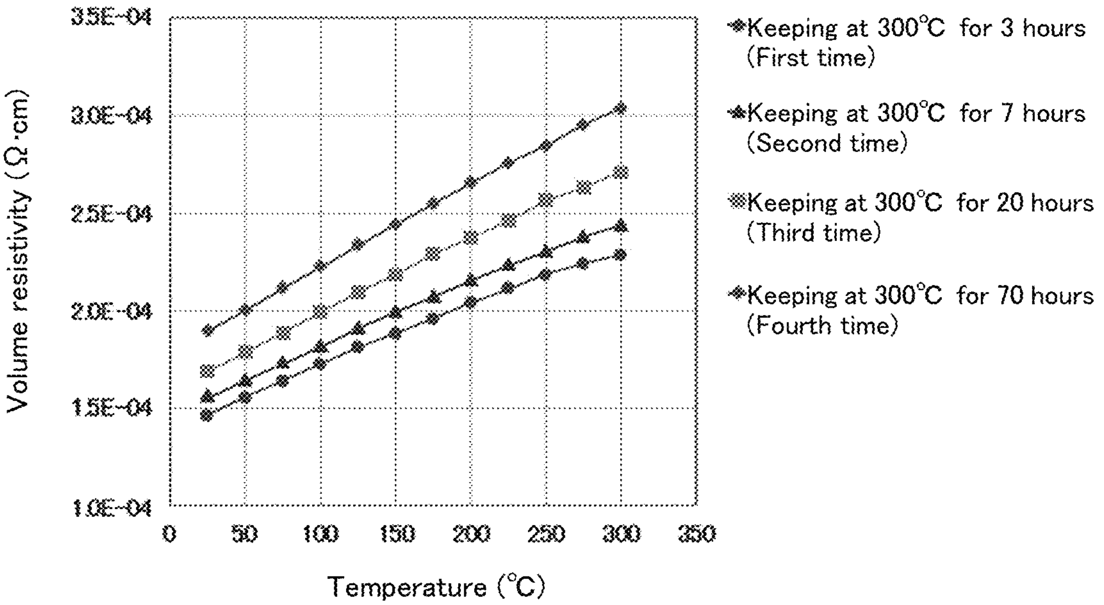

[FIG. 5]
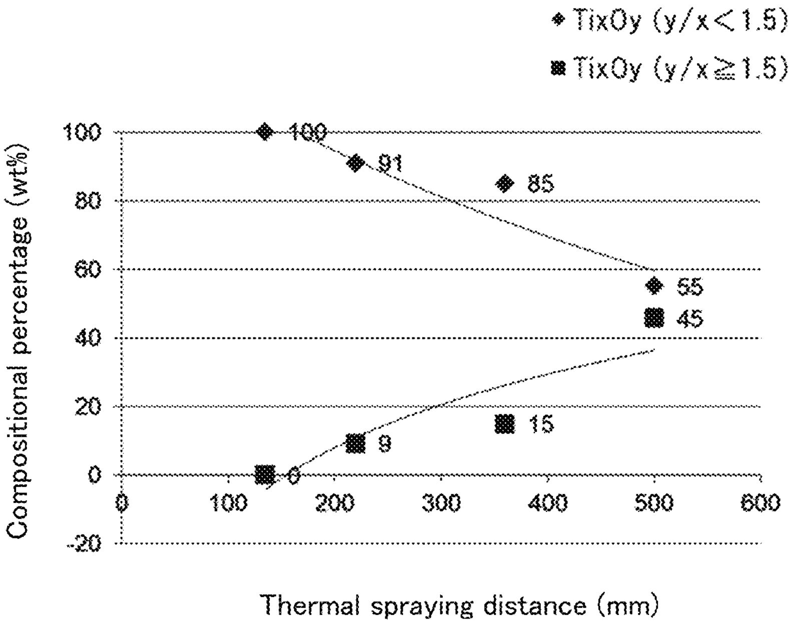

[FIG. 6]
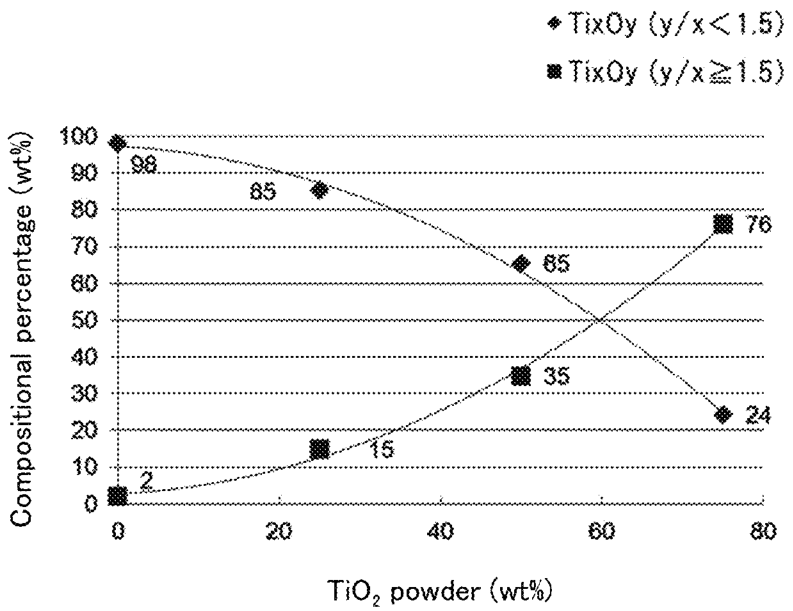

[FIG. 7]
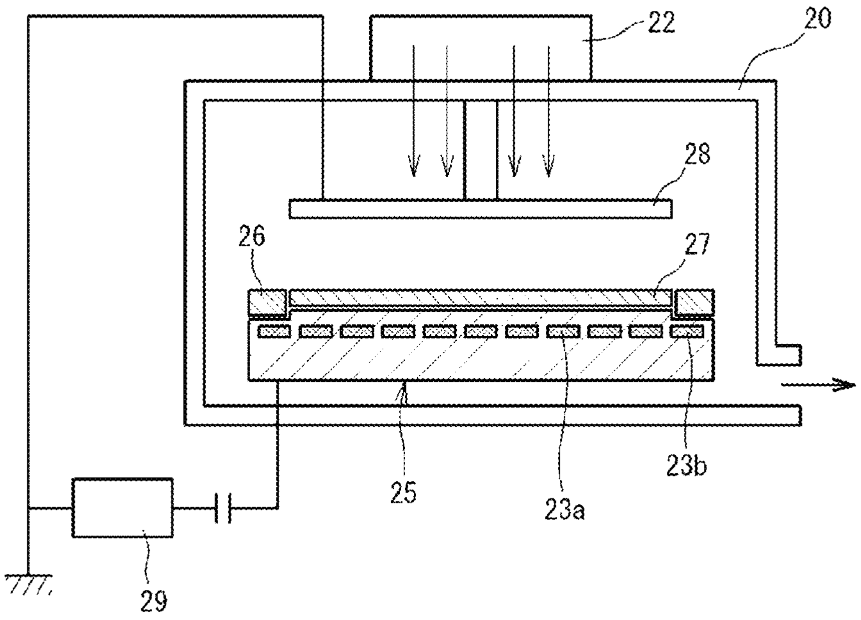

[FIG. 8]
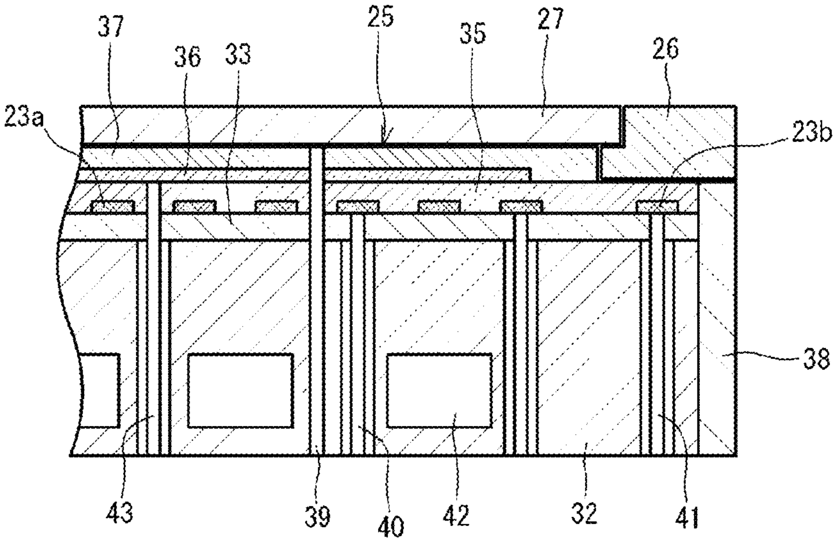

[FIG. 9]
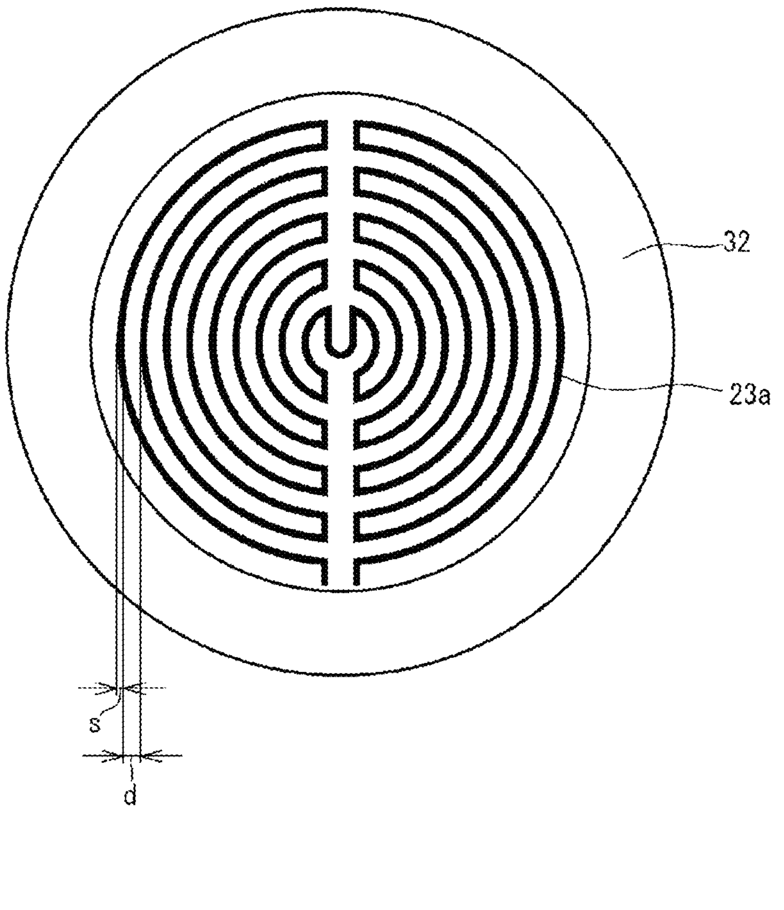

[FIG. 10]
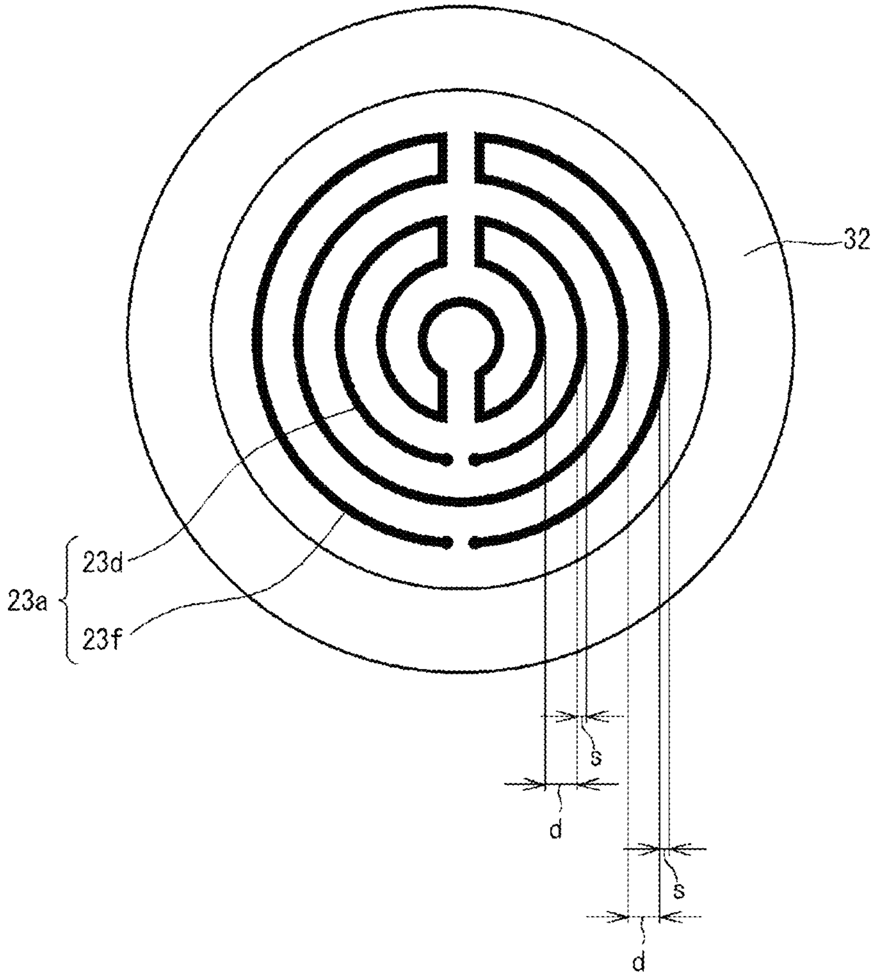

[FIG. 11]
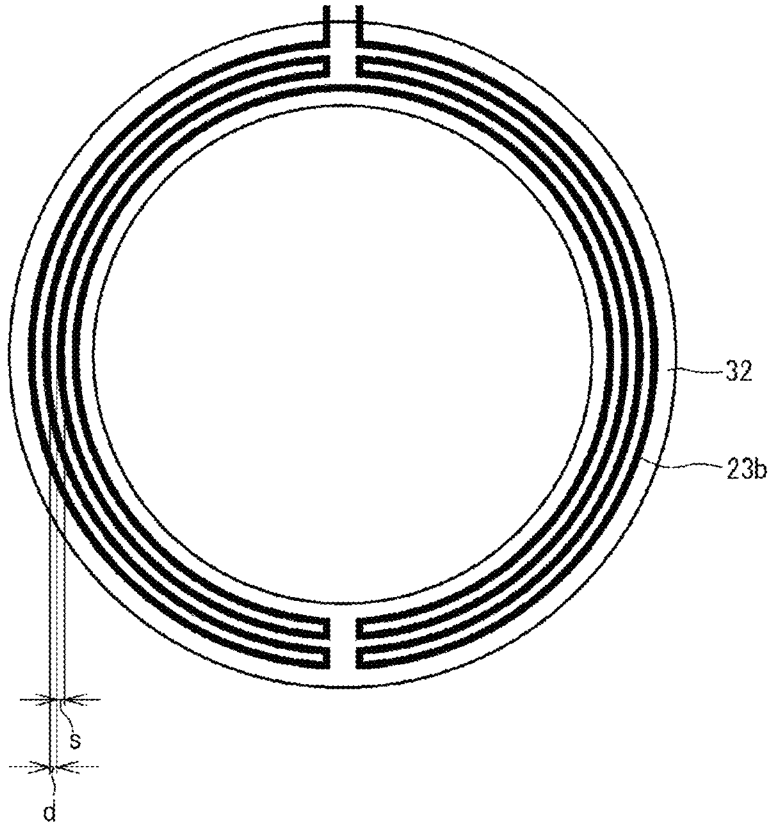

HEAT GENERATING COMPONENT

RELATED APPLICATIONS

The present application is the national phase of International Application No. PCT/JP2017/020545, filed on Jun. 2, 2017, which claims priority to and the benefit of Japanese Patent Application No. 2016-120806, filed on Jun. 17, 2016, and the disclosures of which are hereby incorporated herein by reference in their entireties.

TECHNICAL FIELD

The present invention relates to heat generating components for keeping a temperature of an object to be heated uniform.

BACKGROUND ART

In recent years, a dry method which is carried out under vacuum or reduced pressure, such as dry etching or the like, is often adopted for microfabrication of a wafer in a semiconductor producing process. In the dry etching using plasma, there is heat input from the plasma to the wafer. Since wafer temperature affects the etching rate, if there is unevenness in temperature distribution in the wafer, etching depth varies. Therefore, a heater unit is placed below the wafer and in-plane temperature of the wafer is kept uniform, as described in Patent Literatures 1 to 3.

There are various methods for manufacturing a heater in a part of a semiconductor producing apparatus, and thermal spraying is one method. According to the thermal spraying, a coating having a thin and uniform thickness is obtained, and the degree of freedom for design is also high. In the case of forming a heater by the thermal spraying, tungsten (W) which is a metal having a high melting point is often used as a thermal spray material, as described in Patent Literatures 1 to 3.

CITATION LIST

Patent Literature

[Patent Literature 1] Japanese Laid-Open Patent Publication No. 2002-043033

[Patent Literature 2] Japanese Laid-Open Patent Publication No. 2009-170509

[Patent Literature 3] Japanese Laid-Open Patent Publication No. 2016-027601

SUMMARY OF INVENTION

Technical Problem

The present inventors noticed that characteristics of a heater composed of a thermal sprayed coating formed by using tungsten as a thermal spray material varied from the initial one while using the heater many times. Experiments were conducted to investigate the cause. As a result, it turned out that when the thermal sprayed coating formed by using tungsten as the thermal spray material was maintained at a high temperature condition of about 300° C. for a long time, oxidation of tungsten proceeded, and when returned to room temperature, volume resistivity was changed compared with before rising temperature. There is a problem that when the volume resistivity of the heater changes, temperature control for an object to be heated does not become accurate and when change in the volume resistivity partially occurs, uniformity of the temperature distribution is impaired.

In view of the problems of conventional technologies, the present invention has an object of providing a heat generating component in which the volume resistivity hardly changes even if used repeatedly at a high temperature for a long period of time.

Solution to Problem

The inventors of the present invention have conducted various experiments to find an alternative material to tungsten, and resultantly found that a thermal sprayed coating containing special titanium oxide is hard to change in volume resistivity even if used repeatedly at a high temperature for a long period of time, leading to the solution of the problem.

That is, the heat generating component of the present invention is characterized by comprising: a substrate part; and a thin coating heater part formed on the substrate part, wherein the above-described thin coating heater part comprises a thermal sprayed coating containing $Ti_xO_y$ (wherein, $0<y/x<2.0$ is satisfied).

When the thin coating heater part is formed by using titanium dioxide ($TiO_2$), it is difficult to treat the heater part as a heater because of too high volume resistivity. On the other hand, although titanium metal can be utilized as a material for a heater, there is a concern that the volume resistivity of the heater varies when used repeatedly at a high temperature for a long period of time. However, when the thin coating heater part comprises a thermal sprayed coating containing $Ti_xO_y$ (wherein, $0<y/x<2.0$ is satisfied), that is, titanium oxide in which the ratio of the number of oxygen atoms to the number of titanium atoms is less than 2, the volume resistivity which is suitably used for a heater is obtained, and the volume resistivity varies less even if kept at high temperature region for a long period of time.

It is preferable that the thermal sprayed coating contains $Ti_{x1}O_{y1}$ (wherein, $0<y1/x1<1.5$ is satisfied) and $Ti_{x2}O_{y2}$ (wherein, $1.5\leq y2/x2\leq 2.0$ is satisfied). It is more preferable that a total amount by mass of the $Ti_{x1}O_{y1}$ (wherein, $0<y1/x1<1.5$ is satisfied) is larger than a total amount by mass of the $Ti_{x2}O_{y2}$ (wherein, $1.5\leq y2/x2\leq 2.0$ is satisfied), in the above-described thermal sprayed coating.

A width of the thin coating heater part is preferably 1-20 mm. A thickness of the thin coating heater part is preferably 30-1000 μm. An interline distance of the thin coating heater part is preferably 0.5-50 mm.

The constitution of the heat generating component according to the present invention is not limited. It is possible to adopt a constitution in which a ceramic insulating layer is provided on the thin coating heater part, for example.

Advantageous Effects of Invention

According to the present invention, the heat generating component is provided with the substrate part and the thin coating heater part formed on the substrate part. Since this thin coating heater part comprises a thermal sprayed coating containing $Ti_xO_y$ (wherein, $0<y/x<2.0$ is satisfied), that is, titanium oxide in which the ratio of the number of oxygen atoms to the number of titanium atoms is less than 2, it is possible to give volume resistivity which is suitably used for a heater and to make it difficult to change the volume resistivity even if predetermined temperature change and temperature keeping are repeated.

BRIEF DESCRIPTION OF DRAWINGS

FIG. 1 is a schematic perspective view showing a basic configuration of a heat generating component according to one embodiment of the present invention.

FIG. 2 is a schematic plan view showing a typical pattern of a thin coating heater part.

FIG. 3 is a graph showing the change in volume resistivity with the temperature change of a thin coating heater part of Sample A.

FIG. 4 is a graph showing the change in volume resistivity with the temperature change of a thin coating heater part of Sample B.

FIG. 5 is a graph showing the compositional percentage of a thin coating heater part of Samples E to H.

FIG. 6 is a graph showing the compositional percentage of a thin coating heater part of Samples I to K.

FIG. 7 is a schematic sectional view of a plasma processing apparatus to which a heat generating component according to one embodiment of the present invention is applied.

FIG. 8 is an enlarged schematic sectional view of an electrostatic chuck in FIG. 7.

FIG. 9 is a schematic plan view showing a pattern example of a thin coating heater part located below a wafer.

FIG. 10 is a schematic plan view showing another pattern example of a thin coating heater part located below a wafer.

FIG. 11 is a schematic plan view showing a pattern of a thin coating heater part located below a focus ring.

DESCRIPTION OF EMBODIMENTS

Embodiment 1

FIG. 1 is a schematic perspective view showing a basic configuration of a heat generating component according to one embodiment of the present invention. The heat generating component 11 shown in FIG. 1 can be produced as described below.

First, a substrate part 12 having an insulating surface is prepared, and a thermal spray material is thermally sprayed on the surface of the substrate part 12 under predetermined conditions to form a thin coating heater part 13. A pattern of the thin coating heater part 13 may be produced by previously masking the surface of the substrate part 12 in the form of the pattern and then, thermally spraying the material on the entire surface thereof, or may be produced by previously thermally spraying the material on the entire surface of the substrate part 12, masking a surface of a thermal sprayed coating in the form of the pattern and then, removing unnecessary thermal sprayed coating by machining or blasting.

After forming the thin coating heater part 13, an insulating material such as $Al_2O_3$ or the like is thermally sprayed to form an insulating layer 14 covering the surface of the substrate part 12 and the entire surface of the thin coating heater part 13.

This results in a heat generating component 11 having the substrate part 12 and the thin coating heater part 13 patterned on the substrate part 12, in which they are covered with the insulating layer 14. The object to be heated by the thin coating heater part 13 may be heated via the substrate part 12 or may be heated via the insulating layer 14.

The thin coating heater part 13 has a specific resistance value which is usable for a heater. Terminals and lead wires 15, 16 are attached to both end portions of the thin coating heater part 13, and an object placed on the substrate part 12 or the insulating layer 14 can be heated by passing electric current through the thin coating heater part 13 by applying a predetermined voltage.

The composition of the insulating layer 14 is not particularly limited. Oxide-based ceramics such as $Al_2O_3$, $Y_2O_3$, $ZrO_2$, and the like are suitable. The insulating layer 14 may be formed by a thermal spraying method or a method other than the thermal spraying method.

The thin coating heater part 13 is composed of the thermal sprayed coating. In the case of the thermal spraying method, the thin coating can be formed with high accuracy and uniformly without being limited by the size and shape of the substrate. As a method for obtaining special titanium oxide contained in the thin coating heater part 13, which will be described later, a thermal spraying method is suitable. The type of the thermal spraying method is not particularly limited. The thermal spraying method here also includes a so-called cold spray method.

The shape of the substrate part 12 is not particularly limited, and is a plate shape, a bowl shape, a column shape, a cylindrical shape, a tapered shape, or the like. That is, the surface of the substrate part 12 may be flat or curved. Also, if the inside of the substrate part 12 is hollowed out like a cylindrical shape, the thin coating heater part 13 may be formed on the outer surface or the inner surface of the substrate part 12.

The substrate part 12 may be an insulating component made of ceramics, quartz glass, or the like. Additionally, the substrate 12 may be a conductive component such as an aluminum-based alloy, a titanium-based alloy, a copper-based alloy, a stainless steel, or the like, of which surface is covered with an insulating coating. The insulating coating does not need to cover all of the conductive components and may cover at least a surface on which the thin coating heater part 13 is to be formed. Further, the surface of the insulating component made of ceramics, quartz glass, or the like may be covered with another insulating coating.

The substrate part 12 may further have a water cooling structure. Thereby, a temperature of the substrate part is fixed and it becomes easier to control a temperature of the thin coating heater part 13. When the substrate part 12 has the water cooling structure, it is preferable to use a material having low thermal conductivity such as yttria stabilized zirconia (YSZ) or the like for the insulating coating covering the surface of the conductive component.

FIG. 2 is a schematic plan view showing a typical pattern of a thin coating heater part. As shown in FIG. 2, the thin coating heater part 13 is patterned on the substrate part 12, so that present are a plurality of mutually parallel linear parts and bent parts connecting these linear parts at the ends to each other, wholly forming a zigzag pattern, to constitute a pseudo-surface. In a planar pattern of one sheet, current concentrates only in a region linearly connecting between terminals **19*a* and 19*b* to which voltage is applied and in the vicinity thereof, the current does not reach the outer edge part, and unevenness occurs in the temperature distribution. By forming the thin coating heater part 13 in a linear pattern as shown in FIG. 2, current can flow through the entire thin coating heater part 13**, and unevenness in the temperature distribution can be eliminated. The bent parts are not limited to bent parts that are bent at right angle, and may be bent parts that curve to form an arc.

In FIG. 2, the thin coating heater part 13 has a zigzag pattern. However, the thin coating heater part 13 may be composed of only straight parts or only curved parts when temperature uniformity is not strictly required and when the size or shape at which temperature uniformity is not impaired is targeted. It is possible to change design of the thin coating heater part 13 depending on needs.

A thickness t of the thin coating heater part 13 (see FIG. 1) is preferably in the range of 30-1000 μm. When the thickness t of the thin coating heater part 13 is 30 μm or more, excellent functions as a heater can be exerted easily. When the thickness t is 1000 μm or less, it is possible to prevent extreme expansion of dimensions.

A width s in a direction orthogonal to a longitudinal direction of the thin coating heater part 13 is preferable in the range of 1-20 mm. When the width s of the thin coating heater part 13 is 1 mm or more, it is possible to reduce the possibility of breakage. When the width s is 20 mm or less, it is possible to prevent generation of peeling of the insulating layer 14 formed on the thin coating heater part 13.

An interline distance d of the thin coating heater part 13 is preferably in the range of 0.5-50 mm. When the interline distance d of the thin coating heater part 13 is 0.5 mm or more, it is possible to avoid short circuit. When the interline distance d is 50 mm or less, it is possible to more suppress unevenness in the temperature distribution.

The thermal sprayed coating constituting the thin coating heater part 13 is porous, and its average porosity is preferably in the range of 1-10%. When the porosity is less than 1%, the influence of the residual stress existing in the coating becomes larger and there is a possibility that it is likely to break. When the porosity is more than 10%, various gases tend to enter pores and durability of the coating may decrease. An average porosity can be obtained by observing the cross section of the thermal sprayed coating with an optical microscope, binarizing the observed image, treating black region inside the coating as pore parts, and calculating the ratio of the area of the black region occupied in the entire region.

The thin coating heater part 13 essentially contains $Ti_xO_y$ (wherein, $0<y/x<2.0$ is satisfied), that is, titanium oxide in which the ratio of the number of oxygen atoms to the number of titanium atoms is less than 2. Preferably, the thin coating heater part 13 contains the $Ti_xO_y$ (wherein, $0<y/x<2.0$ is satisfied) as a main component. The "main component" as used herein refers to the component most frequently contained on a mass basis. Specific examples of the $Ti_xO_y$ (wherein, $0<y/x<2.0$ is satisfied) include TiO, $Ti_2O$, $Ti_3O$, $Ti_2O_3$, and the like. The thin coating heater part 13 may contain any of these compounds singly or may contain a mixture of a plurality thereof.

The thin coating heater part 13 is preferably composed of a thermal sprayed coating containing $Ti_{x1}O_{y1}$ (wherein, $0<y1/x1<1.5$ is satisfied) and $Ti_{x2}O_{y2}$ (wherein, $1.5\leq y2/x2\leq 2.0$ is satisfied). The $Ti_{x1}O_{y1}$ (wherein, $0<y1/x1<1.5$ is satisfied) includes, for example, TiO, $Ti_2O$, $Ti_3O$ and the like, and the $Ti_{x2}O_{y2}$ (wherein, $1.5\leq y2/x2\leq 2.0$ is satisfied) includes, for example, $TiO_2$, $Ti_2O_3$ and the like. Thus, even if kept at a high temperature for a long period of time, the change in composition is reduced and the change in volume resistivity can be suppressed. As a result, stability as a heater increases. More preferably, the thin coating heater part 13 is composed of a thermal sprayed coating consisting of $Ti_{x1}O_{y1}$ (wherein, $0<y1/x1<1.5$ is satisfied), $Ti_{x2}O_{y2}$ (wherein, $1.5\leq y2/x2\leq 2.0$ is satisfied), and inevitable impurities. Further preferably, the thin coating heater part 13 is composed of a thermal sprayed coating consisting of $Ti_{x1}O_{y1}$ (where, $0<y1/x1<1.5$ is satisfied) and the inevitable impurities.

When the thin coating heater part 13 is composed of a thermal sprayed coating containing $Ti_{x1}O_{y1}$ (wherein, $0<y1/x1<1.5$ is satisfied) and $Ti_{x2}O_{y2}$ (wherein, $1.5\leq y2/x2\leq 2.0$ is satisfied), it is preferable that the total amount by mass of $Ti_{x1}O_{y1}$ (wherein, $0<y1/x1<1.5$ is satisfied) is larger than the total amount by mass of $Ti_{x2}O_{y2}$ (wherein, $1.5\leq y2/x2\leq 2.0$ is satisfied). Thus, the volume resistivity of the thin coating heater part 13 does not become too high, and it is possible to save power consumption. Even if kept at a high temperature for a long period of time, the change in composition is less. Even if the change in composition occurs, the volume resistivity within the range usable for a heater is easily maintained.

The thin coating heater part 13 is suitably prepared by a thermal spraying method using Ti powder or a mixture of the Ti powder and $TiO_2$ powder as a thermal spray material. Even if a thermal spray material consisting of titanium powder is used, oxidation of titanium proceeds by high heat of flame and oxygen in the air depending on the thermal spraying method. Therefore, a thermal sprayed coating containing $Ti_xO_y$ (wherein, $0<y/x<2$ is satisfied) can be formed. It is also possible to finely adjust the ratio of Ti to O in the thermal sprayed coating by changing thermal spraying methods or thermal spraying conditions.

If the thin coating heater part 13 is constituted of a thermal sprayed coating consisting of $TiO_2$, the volume resistivity is too high as described later, hence, it is difficult to treat it as a heater. In contrast, when the thin coating heater part 13 is constituted of a thermal sprayed coating containing $Ti_xO_y$ (wherein, $0<y/x<2.0$ is satisfied), that is, titanium oxide in which the ratio of the number of oxygen atoms to the number of titanium atoms is less than 2, proper volume resistivity is obtained, and excellent functions as the thin coating heater part 13 can be exterted. Further, even if the thin coating heater part 13 having such a composition is exposed to a high-temperature environment for a long period of time, the volume resistivity hardly varies, thus, stability as a heater is excellent.

Hereinafter, shown are experimental results obtained by measuring the volume resistivity of each titanium oxide coating according to the present invention and tungsten coating conventionally employed as a heater.

A titanium oxide coating containing $Ti_xO_y$ (wherein, $0<y/x<2.0$ is satisfied) was formed by a thermal spraying method to give a sample as Sample A. Firstly, an $Al_2O_3$ coating having a thickness of 300 μm was formed on an aluminum substrate by an atmospheric plasma thermal spraying method, using $Al_2O_3$ powder as a raw material. Secondly, a thermal sprayed coating containing $Ti_xO_y$ (wherein, $0<y/x<2.0$ is satisfied) having a thickness of 150 μm was formed on the $Al_2O_3$ coating by the atmospheric plasma thermal spraying method, using Ti powder as a raw material. Details of composition of the thermal sprayed coating are as shown in the following Table 1. Finally, a $Y_2O_3$ coating having a thickness of 300 μm was formed on the thermal sprayed coating containing $Ti_xO_y$ (wherein, $0<y/x<2.0$ is satisfied) by the atmospheric plasma thermal spraying method, using $Y_2O_3$ powder as a raw material.

A tungsten coating was formed by a thermal spraying method to give a sample as Sample B. Firstly, an $Al_2O_3$ coating having a thickness of 300 μm was formed on an aluminum substrate by an atmospheric plasma thermal spraying method, using $Al_2O_3$ powder as a raw material. Secondly, a tungsten coating having a thickness of 150 μm was formed on the $Al_2O_3$ coating by the atmospheric plasma thermal spraying method, using tungsten powder as a raw material. Finally, a $Y_2O_3$ coating having a thickness of 300

μm was formed on the tungsten coating by the atmospheric plasma thermal spraying method, using $Y_2O_3$ powder as a raw material.

For Sample A, temperature rise from room temperature to 300° C. and cooling were repeated as follows, and the volume resistivity (Ω·cm) at each temperature during temperature rise was measured by the Four-terminal method. The measurement results are shown in FIG. 3.

First time:

Temperature was raised from room temperature to 300° C. and kept for 3 hours. Then, it was left until reaching room temperature.

Second time:

Temperature was raised from room temperature to 300° C. and kept for 3 hours. Then, it was left until reaching room temperature.

Third time:

Temperature was raised from room temperature to 300° C. and kept for 3 hours. Then, it was left until reaching room temperature.

Fourth time:

Temperature was raised from room temperature to 300° C. and kept for 3 hours. Then, it was left until reaching room temperature.

Fifth time:

Temperature was raised from room temperature to 300° C. and kept for 18 hours. Then, it was left until reaching room temperature.

Sixth time:

Temperature was raised from room temperature to 300° C. and kept for 70 hours. Then, it was left until reaching room temperature.

For Sample B, temperature rise from room temperature to 300° C. and cooling were repeated as follows, and the volume resistivity (Ω·cm) at each temperature during temperature rise was measured by the Four-terminal method. The measurement results are shown in FIG. 4.

First time:

Temperature was raised from room temperature to 300° C. and kept for 3 hours. Then, it was left until reaching room temperature.

Second time:

Temperature was raised from room temperature to 300° C. and kept for 7 hours. Then, it was left until reaching room temperature.

Third time:

Temperature was raised from room temperature to 300° C. and kept for 20 hours. Then, it was left until reaching room temperature.

Fourth time:

Temperature was raised from room temperature to 300° C. and kept for 70 hours. Then, it was left until reaching room temperature.

For Sample B as shown in FIG. 4, the volume resistivity of the thin coating heater part 13 increased with temperature rise. When the temperature was stopped rising and left until reaching room temperature, the volume resistivity returned to the value close to that in the initial state before heating. However, the volume resistivity at room temperature before heating did not coincide with the volume resistivity at room temperature after once heating, indicating a tendency to increase. The tendency appeared more markedly as the number of times of temperature rise increased. When comparing the volume resistivity at room temperature in the initial state with the volume resistivity at room temperature after being cooled via four temperature rise processes, the change in volume resistivity of about $0.5\times10^{-4}$ Ω·cm was observed. As shown in FIG. 4, such a tendency of the volume resistivity to increase was observed not only in the initial state (at room temperature) but also after heating (for example, at 300° C.), and it was confirmed that the volume resistivity increased at any temperature condition. Furthermore, it was confirmed that such a change in volume resistivity also occurred even when the thin coating heater part 13 was covered with the ceramic insulating layer 14.

On the other hand, for Sample A as shown in FIG. 3, the volume resistivity of the thin coating heater part 13 decreased with the temperature rise. When the temperature was stopped rising and left until reaching room temperature, the volume resistivity returned to the value approximately same as that in the initial state before heating. For Sample A, there was hardly any change in volume resistivity at room temperature even after keeping at a high temperature for a while, and no change was observed likewise even when the same temperature rise and high temperature keeping were repeated. An amount of the change in volume resistivity itself for Sample A during temperature raise was smaller as compared with an amount of the change in volume resistivity for Sample B.

It was confirmed from the above that by using the thermal sprayed coating containing $Ti_xO_y$ (wherein, $0<y/x<2.0$ is satisfied) according to the present invention as a thin coating heater part, obtained is a stable heat generating component that hardly shows the change in volume resistivity at both room temperature and raised temperatures.

For further comparison, a $TiO_2$ coating was formed by a thermal spraying method to give a sample as Sample C. Firstly, an $Al_2O_3$ coating having a thickness of 300 μm was formed on an aluminum substrate by an atmospheric plasma thermal spraying method, using $Al_2O_3$ powder as a raw material. Secondly, a $TiO_2$ coating having a thickness of 150 μm was formed on the $Al_2O_3$ coating by the atmospheric plasma thermal spraying method, using $TiO_2$ powder as a raw material. Finally, a $Y_2O_3$ coating having a thickness of 300 μm was formed on the $TiO_2$ coating by the atmospheric plasma thermal spraying method, using $Y_2O_3$ powder as a raw material. In addition, a Ti bulk substrate having a thickness of 150 μm was prepared as Sample D.

Each thin coating heater part 13 of Sample C and Sample D was heated to 300° C. and kept at this temperature for 100 hours thereafter.

In addition, in order to investigate composition of the thin coating heater part before heating and after heating at 300° C. for 100 hours in each of Samples A to D, compositional analysis was carried out using an X-ray diffractometer. Tables 1 and 2 show the composition at room temperature directly after thermal spraying and the composition after heating at 300° C. for 100 hours for each thermal sprayed coating. In order to evaluate suitability for a heater, the volume resistivity (Ω·cm) of the thin coating heater part after heating at 300° C. for 100 hours was measured by the Four-terminal method also for Sample C and Sample D. As shown in Tables 1 and 2, the followings were confirmed. For the thermal sprayed coating (Sample A) obtained by thermally spraying titanium powder, the compositional percentage was in the range of $Ti_xO_y$ (wherein, $0<y/x<2.0$ is satisfied) even when keeping at a high temperature was repeated. Whereas for the thermal sprayed coating (Sample B) obtained by thermally spraying tungsten powder, tungsten oxide ($W_3O_8$) was generated due to repetition of keeping at a high temperature. This tungsten oxide ($W_3O_8$) is believed to have influenced the change in volume resistivity.

TABLE 1

| | Thermal spray material | | Thermal sprayed coating | | | |
|---|---|---|---|---|---|---|
| | | | | Percentage (% by mass) | | Volume resistivity (Ω · cm) |
| | | | | | After heating | After heating |
| | Composition | Percentage (% by mass) | Composition | At forming of coating | to 300° C. for 100 hours | to 300° C. for 100 hours |
| Sample A (Ex. 1) | Ti | 100 | $Ti_xO_y$ ($0 < y/x < 1.5$) | 99 | 99 | $1.2 \times 10^{-3}$ |
| | | | $Ti_xO_y$ ($1.5 \leq y/x < 2.0$) | 1 | 1 | |
| Sample B (Com. Ex. 1) | W | 100 | W | 100 | 97 | $3.0 \times 10^{-4}$ |
| | | | $W_3O_8$ | 0 | 3 | |
| Sample C (Com. Ex. 2) | $TiO_2$ | 100 | $TiO_2$ | 100 | 100 | $1.3 \times 10^{-1}$ |

TABLE 2

| | | | | Percentage (% by mass) | | Volume resistivity (Ω · cm) |
|---|---|---|---|---|---|---|
| | Composition | Percentage (% by mass) | Composition | Before heating | After heating to 300° C. for 100 hours | After heating to 300° C. for 100 hours |
| Sample D (Com. Ex. 3) | Ti (bulk) | 100 | Ti | 100 | 98 | $4.8 \times 10^{-5}$ |
| | | | $TiO_2$ | 0 | 2 | |

It was clarified from the above that when formed on the substrate part 12 of the heat generating component 11 is the thin coating heater part 13 by using the thermal sprayed coating containing $Ti_xO_y$ (wherein, $0<y/x<2.0$ is satisfied), it is possible to give the thin coating heater part 13 the volume resistivity which is suitably used for a heater and to make it difficult to change the volume resistivity of the thin coating heater part 13 even if keeping at a high temperature is repeated.

As other examples of the present invention, the following Samples E to H were further prepared.

Sample E:

An $Al_2O_3$ coating having a thickness of 450 μm was formed on an aluminum substrate by an atmospheric plasma thermal spraying method, using $Al_2O_3$ powder as a raw material. Subsequently, the distance from a thermal spray nozzle to the substrate part was set to 135 mm, and a thermal sprayed coating containing $Ti_xO_y$ (wherein, $0<y/x<2.0$ is satisfied) having a thickness of 150 μm was formed on the $Al_2O_3$ coating by the atmospheric plasma thermal spraying method, using Ti powder as a raw material.

Sample F:

An $Al_2O_3$ coating having a thickness of 450 μm was formed on an aluminum substrate by an atmospheric plasma thermal spraying method, using $Al_2O_3$ powder as a raw material. Subsequently, the distance from a thermal spray nozzle to the substrate part was set to 220 mm, and a thermal sprayed coating containing $Ti_xO_y$ (wherein, $0<y/x<2.0$ is satisfied) having a thickness of 150 μm was formed on the $Al_2O_3$ coating by the atmospheric plasma thermal spraying method, using Ti powder as a raw material.

Sample G:

An $Al_2O_3$ coating having a thickness of 450 μm was formed on an aluminum substrate by an atmospheric plasma thermal spraying method, using $Al_2O_3$ powder as a raw material. Subsequently, the distance from a thermal spray nozzle to the substrate part was set to 360 mm, and a thermal sprayed coating containing $Ti_xO_y$ (wherein, $0<y/x<2.0$ is satisfied) having a thickness of 150 μm was formed on the $Al_2O_3$ coating by the atmospheric plasma thermal spraying method, using Ti powder as a raw material.

Sample H:

An $Al_2O_3$ coating having a thickness of 450 μm was formed on an aluminum substrate by an atmospheric plasma thermal spraying method, using $Al_2O_3$ powder as a raw material. Subsequently, the distance from a thermal spray nozzle to the substrate part was set to 500 mm, and a thermal sprayed coating containing $Ti_xO_y$ (wherein, $0<y/x<2.0$ is satisfied) having a thickness of 150 μm was formed on the $Al_2O_3$ coating by the atmospheric plasma thermal spraying method, using Ti powder as a raw material.

Table 3 and FIG. 5 show the results of the compositional analysis using the X-ray diffractometer in the thin coating heater part of each of Samples E to H and the measurement results of the volume resistivity (Ω·cm) using the Four-terminal method at room temperature after thermal spraying.

As shown in Table 3 and FIG. 5, it was found that even when using the same Ti powder material, there is a tendency that the longer the thermal spraying distance is, the more the percentage of $Ti_xO_y$ (wherein, $1.5\leq y/x<2.0$ is satisfied) and $TiO_2$ with respect to the whole thermal sprayed coating increases, and the more also the volume resistivity increases.

TABLE 3

| | Thermal spray material | | Thermal spraying distance | Thermal sprayed coating | | |
|---|---|---|---|---|---|---|
| | Composition | Percentage (% by mass) | (mm) | Composition | Percentage (% by mass) | Volume resistivity (Ω · cm) |
| Sample E (Ex. 2) | Ti | 100 | 135 | $Ti_xO_y$ (0 < y/x < 1.5) | 100 | $1.46 \times 10^{-3}$ |
| | | | | $Ti_xO_y$ (1.5 ≤ y/x < 2.0) | 0 | |
| | | | | $TiO_2$ | 0 | |
| Sample F (Ex. 3) | Ti | 100 | 220 | $Ti_xO_y$ (0 < y/x < 1.5) | 91 | $1.67 \times 10^{-3}$ |
| | | | | $Ti_xO_y$ (1.5 ≤ y/x < 2. 0) | 3 | |
| | | | | $TiO_2$ | 6 | |
| Sample G (Ex. 4) | Ti | 100 | 360 | $Ti_xO_y$ (0 < y/x < 1.5) | 85 | $2.52 \times 10^{-3}$ |
| | | | | $Ti_xO_y$ (1.5 ≤ y/x < 2.0) | 13 | |
| | | | | $TiO_2$ | 2 | |
| Sample H (Ex. 5) | Ti | 100 | 500 | $Ti_xO_y$ (0 < y/x < 1.5) | 55 | $3.93 \times 10^{-3}$ |
| | | | | $Ti_xO_y$ (1.5 ≤ y/x < 2.0) | 43 | |
| | | | | $TiO_2$ | 2 | |

As other examples of the present invention, the following Samples I to K were further prepared.

Sample I:

An $Al_2O_3$ coating having a thickness of 450 μm was formed on an aluminum substrate by an atmospheric plasma thermal spraying method, using $Al_2O_3$ powder as a raw material. Subsequently, a thermal sprayed coating containing $Ti_xO_y$ (wherein, 0<y/x<2.0 is satisfied) having a thickness of 150 μm was formed on the $Al_2O_3$ coating by the atmospheric plasma thermal spraying method, using mixed powder of Ti and $TiO_2$ ($Ti/TiO_2$=75/25 (mass ratio)) as a raw material.

Sample J:

An $Al_2O_3$ coating having a thickness of 450 μm was formed on an aluminum substrate by an atmospheric plasma thermal spraying method, using $Al_2O_3$ powder as a raw material. Subsequently, a thermal sprayed coating containing $Ti_xO_y$ (wherein, 0<y/x<2.0 is satisfied) having a thickness of 150 μm was formed on the $Al_2O_3$ coating by the atmospheric plasma thermal spraying method, using mixed powder of Ti and $TiO_2$ ($Ti/TiO_2$=50/50 (mass ratio)) as a raw material.

Sample K:

An $Al_2O_3$ coating having a thickness of 450 μm was formed on an aluminum substrate by an atmospheric plasma thermal spraying method, using $Al_2O_3$ powder as a raw material. Subsequently, a thermal sprayed coating containing $Ti_xO_y$ (wherein, 0<y/x<2.0 is satisfied) having a thickness of 150 μm was formed on the $Al_2O_3$ coating by the atmospheric plasma thermal spraying method, using mixed powder of Ti and $TiO_2$ ($Ti/TiO_2$=25/75 (mass ratio)) as a raw material.

Table 4 and FIG. 6 show the results of the compositional analysis using the X-ray diffractometer in the thin coating heater part of each of Samples I to K and the measurement results of the volume resistivity (Ω·cm) using the Four-terminal method at room temperature after thermal spraying.

As shown in Table 4 and FIG. 6, it was found that even when setting the same thermal spraying distance, there is a tendency that the higher the mixing rate of the $TiO_2$ powder to the Ti powder is, the more the percentage of $Ti_xO_y$ (wherein, 1.5≤y/x<2.0 is satisfied) and $TiO_2$ with respect to the whole thermal sprayed coating increases, and the more also the volume resistivity increases. In Sample K, the $TiO_2$ powder was contained more in the mixed powder than the Ti powder, however the percentage of $TiO_2$ decreased when the thermal sprayed coating was formed. The reason for this may be reduction of $TiO_2$ during atmospheric plasma thermal spraying. In this way, not only the thermal spray material but also the type of the thermal spraying method makes it possible to adjust the composition of the thermal sprayed coating to be formed.

TABLE 4

| | Thermal spray material | | Thermal spraying distance | Thermal sprayed coating | | |
|---|---|---|---|---|---|---|
| | Composition | Percentage (% by mass) | (mm) | Composition | Percentage (% by mass) | Volume resistivity (Ω · cm) |
| Sample I (Ex. 6) | Ti | 75 | 135 | $Ti_xO_y$ (0 < y/x < 1.5) | 85 | $1.61 \times 10^{-3}$ |
| | $TiO_2$ | 25 | | $Ti_xO_y$ (1.5 ≤ y/x < 2.0) | 6 | |
| | | | | $TiO_2$ | 9 | |
| Sample J (Ex. 7) | Ti | 50 | 135 | $Ti_xO_y$ (0 < y/x < 1.5) | 65 | $3.51 \times 10^{-3}$ |
| | $TiO_2$ | 50 | | $Ti_xO_y$ (1.5 ≤ y/x < 2.0) | 10 | |
| | | | | $TiO_2$ | 25 | |
| Sample K (Ex. 8) | Ti | 25 | 135 | $Ti_xO_y$ (0 < y/x < 1.5) | 24 | $1.02 \times 10^{-2}$ |
| | $TiO_2$ | 75 | | $Ti_xO_y$ (1.5 ≤ y/x < 2.0) | 46 | |
| | | | | $TiO_2$ | 30 | |

The thin coating heater part 13 is designed so that a thickness t, a line width s, a length and a volume resistivity are decided, according to the required output to adjust a temperature of an object to be heated, to obtain a prescribed resistance value. A standard of the volume resistivity used for a heater is $1.0\times10^{-4}$-$1.0\times10^{-2}$ Ω·cm. However, since there are practically variations in forming the thin coating heater part 13, there may be cases where the resistance value does not become as designed. In particular, the thickness t and the line width s are important. When the thickness t and the line width s are locally increased, the resistance value of that portion decreases, making it difficult to generate heat, so that a temperature of a part of the object to be heated may become low.

In such a case, after the thin coating heater part 13 is formed, a portion where the resistance value becomes low is detected, and then, a part of the thin coating heater part 13 may be scraped off to modify the thickness t and the line width s so that the resistance value falls within a predetermined range. That is, the thickness t and the line width s of the thin coating heater part 13 may not be uniform, and there may be a cutout portion in some part. As another method for improving temperature uniformity, a thermal diffusing plate may be provided on the thin coating heater part 13 so as to reduce temperature unevenness.

The heat generating component of the present invention is suitably used for, for example, a device for investigating high temperature characteristics of electronic components and the like, a temperature control component in a plasma processing apparatus described later, and the like.

Embodiment 2

FIG. 7 is a schematic sectional view of a plasma processing apparatus to which a heat generating component according to one embodiment of the present invention is applied. As shown in FIG. 7, an electrostatic chuck 25 for holding a wafer 27 is provided in a vacuum chamber 20 of the plasma processing apparatus, and the wafer 27 is put into and out of the vacuum chamber 20 by a transfer arm (not shown) or the like. A gas introduction device 22, an upper electrode 28, and the like are installed in the vacuum chamber 20. The electrostatic chuck 25 incorporates a lower electrode, and a high-frequency power source 29 is connected to the lower electrode and the upper electrode 28. When a high frequency is applied between the lower electrode and the upper electrode 28, introduced processing gas is turned into plasma and ions of the generated plasma are drawn into the wafer 27 to cause etching. As a result, a temperature of the wafer 27 rises. A focus ring 26 is arranged around the wafer 27 so as not to reduce effects of etching also in the vicinity of the outer edge portion of the wafer 27. Below the wafer 27, a first thin coating heater part **23*a* for keeping the temperature of the wafer 27 constant is installed. Below the focus ring 26, a second thin coating heater part 23*b* for keeping a temperature of the focus ring 26** constant is installed.

FIG. 8 is an enlarged schematic sectional view of the electrostatic chuck 25 shown in FIG. 7. The electrostatic chuck 25 is equipped with: a base stand part 32 for holding the wafer 27 and the focus ring 26; a first insulating layer 33 formed on a surface of the base stand part 32; the first thin coating heater part **23*a* and the second thin coating heater part 23*b* formed on a surface of the first insulating layer 33; a second insulating layer 35 formed on the surface of the first insulating layer 33 so as to cover these first and second thin coating heater parts 23*a*, 23*b*; an electrode part 36 formed on a surface of the second insulating layer 35; and a dielectric layer 37 formed as the outermost layer so as to cover the electrode part 36. That is, the electrostatic chuck 25 in this embodiment installs the above-described first and second thin coating heater parts 23*a*, 23*b*, and the base stand part 32 and the first insulating layer 33** function as a substrate part, and therefore, these components constitute the heat generating component according to one embodiment of the present invention.

A side surface of the electrostatic chuck 25 is covered with a covering layer 38 composed of an $Al_2O_3$ coating formed by thermal spraying so that influence of the plasma does not reach the inside of the electrostatic chuck 25.

In the electrostatic chuck 25, a gas pore 39 penetrating in the vertical direction is formed, and the gas pore 39 is connected to a cooling groove (not shown) formed on a surface of the dielectric layer 37. For example, helium gas is introduced between the wafer 27 and the electrostatic chuck 25 through the gas pore 39. Since pressure in the vacuum chamber 20 is reduced, thermal conductivity from the wafer 27 to the electrostatic chuck 25 is low. By introducing gas between the wafer 27 and the electrostatic chuck 25, the wafer 27 conducts heat to the electrostatic chuck 25, thereby ensuring effect of cooling the wafer 27.

The first and second thin coating heater parts **23*a*, 23*b* are adapted to generate heat by energization. The first and second thin coating heater parts 23*a*, 23*b* are formed by the same method and have the same composition as for the thin coating heater part 13 shown in the embodiment 1. A first power supplying pin 40 for supplying power to the first thin coating heater part 23*a* is electrically connected to the first thin coating heater part 23*a* through the base stand part 32 and the first insulating layer 33, and output to the first thin coating heater part 23*a* is adjusted. A second power supplying pin 41 for supplying power to the second thin coating heater part 23*b* is electrically connected to the second thin coating heater part 23*b* through the base stand part 32 and the first insulating layer 33, and output to the second thin coating heater part 23*b* is adjusted. A third power supplying pin 43 for supplying power to the electrode part 36 is electrically connected to the electrode part 36 through the base stand part 32, the first insulating layer 33 and the second insulating layer 35, and application of voltage to the electrode part 36 is adjusted. In the base stand part 32, a cooling path 42 through which a refrigerant passes is formed so that the base stand part 32 is cooled by the refrigerant passed through the cooling path 42**.

A material constituting the base stand part 32 is not limited, and for example, adopted are metals such as aluminum-based alloy, titanium-based alloy, copper-based alloy, stainless steel and the like, ceramics such as AN, SiC and the like, composite materials of these metals and ceramics, and the like. A temperature of the refrigerant flowing through the cooling path 42 of the base stand part 32 is −20-200° C. The temperature of the refrigerant is adjusted according to cooling speed for the wafer 27 and the focus ring 26, and according to heating ability of the first and second thin coating heater parts **23*a*, 23*b***.

The first insulating layer 33 formed on the surface of the base stand part 32 is composed of an $Al_2O_3$ coating formed by thermal spraying. The first insulating layer 33 insulates between the base stand part 32 and the first thin coating heater part **23*a*, and between the base stand part 32 and the second thin coating heater part 23*b*. The second insulating layer 35 formed on the surface of the first insulating layer 33 so as to cover the first and second thin coating heater parts 23*a*, 23*b* is composed of an $Al_2O_3$ coating formed by thermal spraying. The second insulating layer 35 insulates between the first thin coating heater part 23*a* and the electrode part 36. Each of a thickness of the first insulating layer 33 and a thickness of the second insulating layer 35 is 50-400 μm. By changing the thickness and the material of each of the first insulating layer 33 and the second insulating layer 35, heat removing efficiency by the first insulating layer 33 and the second insulating layer 35** can be controlled.

When the thickness of the first insulating layer 33 and the thickness of the second insulating layer 35 are made smaller and the material having a larger thermal conductance is used, the heat removing efficiency can be heightened. When the heat removing efficiency is heightened, the cooling speed for the wafer 27 and the focus ring 26 rises. On the other hand, if the first insulating layer 33 becomes thinner, the base stand part 32 easily takes heat of the first and second thin coating heater parts 23*a*, 23*b*. Hence, it is necessary to increase the output of the first and second thin coating heater parts 23*a*, 23*b*. When the thickness of the first insulating layer 33 and the thickness of the second insulating layer 35 are made larger and the material having a smaller thermal conductance is used, the heat removing efficiency can be lowered. Representative one having a small thermal conductance is PSZ (partially stabilized zirconia). When the heat removing efficiency is lowered, the cooling speed for the wafer 27 and the focus ring 26 falls. On the other hand, if the first insulating layer 33 becomes thicker or the material having a smaller thermal conductance is used, it becomes difficult for the base stand part 32 to take heat of the first and second thin coating heater parts 23*a*, 23*b*. Hence, necessity to increase the output of the first and second thin coating heater parts 23*a*, 23*b* disappears. For example, when the cooling speed for the wafer 27 and the focus ring 26 is too high, the thickness of the first insulating layer 33 and the thickness of the second insulating layer 35 may be increased, and the material having a small thermal conductance may be used. In this case, it is possible to reduce the maximum output of the first and second thin coating heater parts 23*a*, 23*b*.

The electrode part 36 formed on the surface of the second insulating layer 35 is composed of tungsten coating formed by thermal spraying. By applying voltage to the electrode part 36, the electrostatic chuck 25 adsorbs the wafer 27. The dielectric layer 37 formed on the surface of the second insulating layer 35 so as to cover the electrode part 36 is composed of an $Al_2O_3$ coating formed by thermal spraying. A thickness of the electrode part 36 is 30-100 μm and a thickness of the dielectric layer 37 is 50-400 μm.

The $Al_2O_3$ coatings constituting the first insulating layer 33, the second insulating layer 35, and the dielectric layer 37 are those formed on the surface of the base stand part 32, the surface of the first insulating layer 33, and the surface of the second insulating layer 35, respectively, by an atmospheric plasma thermal spraying method using $Al_2O_3$ powder as a raw material. The tungsten coating constituting the electrode part 36 is one formed on the surface of the second insulating layer 35 by the atmospheric plasma thermal spraying method using tungsten powder as a raw material. The thermal spraying method for forming the $Al_2O_3$ coating and the tungsten coating is not limited to the atmospheric plasma thermal spraying method but may be a low-pressure plasma thermal spraying method, a water stabilized plasma thermal spraying method, or a high-speed or low-speed flame thermal spraying method.

It is preferable to adopt thermal spraying powder having a particle size in the range of 5-80 μm. When the particle size is too small, fluidity of the powder is lowered and stable supply is impossible. As a result, the thickness of the coating tends to be ununiform. On the other hand, when the particle size is too large, the coating is formed without complete melting of the powder and becomes excessively porous. As a result, coating quality becomes coarse.

The sum of the thicknesses of the respective thermal sprayed coatings constituting the first insulating layer 33, the first or second thin coating heater part 23*a*, 23*b*, the second insulating layer 35, the electrode part 36, and the dielectric layer 37 is preferably in the range of 200-1500 μm, more preferably in the range of 300-1000 μm. When the sum is less than 200 μm, uniformity of each of the thermal sprayed coatings decreases and coating function cannot be exhibited sufficiently. When the sum is more than 1500 μm, influence of the residual stress in each of the thermal sprayed coatings becomes large and the coating may be easily broken.

Each of the above-mentioned thermal sprayed coatings is porous, and its average porosity is preferably in the range of 1-10%. The average porosity can be adjusted by the thermal spraying methods or thermal spraying conditions. When the average porosity is less than 1%, the influence of the residual stress in each of the thermal sprayed coatings becomes large and there is a fear that the coating may be easily broken. When the average porosity is more than 10%, various gases used in a semiconductor producing process become easy to penetrate into each of the thermal sprayed coatings and there is a possibility that durability is lowered.

In the above examples, $Al_2O_3$ is adopted as the material of each of the thermal sprayed coatings constituting the first insulating layer 33, the second insulating layer 35, the dielectric layer 37 and the covering layer 38, but other oxide-based ceramics, nitride-based ceramics, fluoride-based ceramics, carbide-based ceramics, boride-based ceramics, or compounds or mixtures containing them, may be adopted. Among them, the oxide-based ceramics, the nitride-based ceramics, the fluoride-based ceramics, or the compounds containing them are suitable.

The oxide-based ceramics are stable in an oxygen-based plasma used in a plasma etching process and exhibit relatively satisfactory plasma resistance even in a chlorine-based plasma. Due to high hardness of the nitride-based ceramics, damage by friction with the wafer is small, and wear powder and the like are unlikely to be generated. In addition, since the nitride-based ceramics have a relatively high thermal conductivity, it is easy to control a temperature of the wafer during processing. The fluoride-based ceramics are stable in a fluorine-based plasma and can exhibit excellent plasma resistance.

Specific examples of the oxide-based ceramics other than $Al_2O_3$ include $TiO_2$, $SiO_2$, $Cr_2O_3$, $ZrO_2$, $Y_2O_3$, MgO, and CaO. Examples of the nitride-based ceramics include TiN, TaN, AlN, BN, $Si_3N_4$, HfN, NbN, YN, ZrN, $Mg_3N_2$, and $Ca_3N_2$. Examples of the fluoride-based ceramics include LiF, $CaF_2$, $BaF_2$, $YF_3$, $AlF_3$, $ZrF_4$, and $MgF_2$. Examples of the carbide-based ceramics include TiC, WC, TaC, $B_4C$, SiC, HfC, ZrC, VC, and $Cr_3C_2$. Examples of the boride-based ceramics include $TiB_2$, $ZrB_2$, $HfB_2$, $VB_2$, $TaB_2$, $NbB_2$, $W_2B_5$, $CrB_2$, and $LaB_6$.

For the first insulating layer 33 and the second insulating layer 35, materials simultaneously satisfying required thermal conductivity and insulating property are particularly suitable among the above-described materials. For the dielectric layer 37, materials simultaneously having thermal conductivity, dielectric property, plasma resistance, and wear resistance are particularly suitable among the above-described materials. It is better that the thermal conductivity of a dielectric layer is higher.

FIG. 9 and FIG. 10 are schematic plan views showing pattern examples of the first thin coating heater part 23*a* located below the wafer 27.

The first thin coating heater part 23*a* shown in FIG. 9 is formed on the base stand part 32 and is formed in a pseudo circular shape according to the shape of the wafer 27 to be placed above the first thin coating heater part 23*a*. More specifically, the first thin coating heater part 23*a* is formed to be substantially concentric. The first thin coating heater part 23*a* extends from one end located near the outer edge of the circular base stand part 32 toward a point on the opposite side of the circle so as to draw an arc. It bends so as to fold back to the center side from the point on the opposite side, and similarly extends to near the original starting point so as to draw an arc. Then, it bends again so as to fold back from near the starting point toward the center side. These are repeated a plurality of times, and it extends so as to gradually approach the center of the circle. When reaching the center of the circle, it extends so as to draw the arc a plurality of times from the center of the circle toward the outer edge side so that bilaterally symmetrical shape is formed. After bending a plurality of times, it reaches another end located around the outer edge of the base stand part. In this way, by drawing the first thin coating heater part 23*a* in a substantially concentric circle, it is possible to form a circular pseudo surface that can uniformly heat the surface by one line.

The first thin coating heater part 23*a* is wired in a narrow elongated shape with a line width s of 1-20 mm. The line width s of the first thin coating heater part 23*a* is preferably 20 mm or less, more preferably 5 mm or less. An adhesion force of the second insulating layer 35 to the first thin coating heater part 23*a* is smaller than that to the first insulating layer 33. Therefore, when the line width s of the first thin coating heater part 23*a* is longer than 20 mm and the exposure range of the first insulating layer 33 is reduced, there occurs a possibility of peeling of the second insulating layer 35 on the first thin coating heater part 23*a*. On the other hand, when the line width s is shorter than 1 mm, there becomes a high possibility of disconnection. Hence, the line width s of the first thin coating heater part 23*a* is preferably 1 mm or more, more preferably 2 mm or more.

An interline distance d of the first thin coating heater part 23*a* is preferably 0.5 mm or more, more preferably 1 mm or more. When the interline distance d of the first thin coating heater part 23*a* is too short, it will be short-circuited. The adhesion force of the second insulating layer 35 to the first thin coating heater part 23*a* is smaller than that to the first insulating layer 33. Therefore, when the interline distance d of the first thin coating heater part 23*a* is short and the exposure range of the first insulating layer 33 is reduced, there occurs a possibility of peeling of the second insulating layer 35 on the first thin coating heater part 23*a*. On the other hand, when the interline distance d becomes too long, an area heated by the first thin coating heater part 23*a* decreases and there is a possibility that uniformity of the temperature distribution is impaired. Hence, the interline distance d of the first thin coating heater part 23*a* is preferably 50 mm or less, more preferably 5 mm or less.

The first thin coating heater part 23*a* may be composed of an internal heater part 23*d* and an external heater part 23*f* located outside thereof as shown in FIG. 10. If divided into two parts, the internal heater part 23*d* and the external heater part 23*f*, the internal region and the external region of the electrostatic chuck 25 can be heated to different temperatures by independently controlling them. The line width s and the interline distance d of each of the internal heater part 23*d* and the external heater part 23*f* may be the same as examples shown in FIG. 9. The internal heater part 23*d* and the external heater part 23*f* may be differently designed with each other.

As described above, the number of components constituting the first thin coating heater part 23*a* is not limited. Depending on the region to be heated, the first thin coating heater part 23*a* may be constituted of one component as shown in FIG. 9, or may be constituted of two components as shown in FIG. 10, alternatively, may be constituted of three or more components.

FIG. 11 is a schematic plan view showing a pattern of the second thin coating heater part 23*b* located below the focus ring 26. As shown in FIG. 11, the second thin coating heater part 23*b* is formed on the base stand part 32 and is formed in a pseudo annular shape according to the shape of the focus ring 26 to be placed above the second thin coating heater part 23*b*. More specifically, the second thin coating heater part 23*b* is formed to be substantially concentric. The second thin coating heater part 23*b* extends from one end located near the outer edge of the circular base stand part 32 toward a point on the opposite side of the circle so as to draw an arc. It bends so as to fold back to the center side from the point on the opposite side, and extends to near the original starting point. Then, it bends again so as to fold back from near the starting point toward the center side. These are repeated to form an annular half. Then, for a remaining half, it extends so as to draw the arc so that bilaterally symmetrical shape is formed. After bending a plurality of times, it reaches another end located around the outer edge of the base stand part. In this way, by drawing the second thin coating heater part 23*b* in a substantially concentric circle, it is possible to form a circular pseudo surface that can uniformly heat the surface by one line.

A line width s of the second thin coating heater part 23*b* is preferably 20 mm or less, more preferably 10 mm or less because of the same reason as for the first thin coating heater part 23*a*. The line width s of the second thin coating heater part 23*b* is preferably 1 mm or more, more preferably 2 mm or more.

An interline distance d of the second thin coating heater part 23*b* is preferably 0.5 mm or more, more preferably 1 mm or more because of the same reason as for the first thin coating heater part 23*a*. The interline distance d of the second thin coating heater part 23*b* is preferably 50 mm or less, more preferably 5 mm or less.

As is the case with the first thin coating heater part 23*a*, the number of components constituting the second thin coating heater part 23*b* is not limited. Depending on the region to be heated, the second thin coating heater part 23*b* may be constituted of one component as shown in FIG. 11, or may be constituted of two or more components.

Before forming the first thin coating heater part 23*a* and the second thin coating heater part 23*b*, a first power supplying pin 40 for supplying power to the first thin coating heater part 23*a* and a second power supplying pin 41 for supplying power to the second thin coating heater part 23*b* are previously penetrated through the base stand part 32 and the first insulating layer 33, and then, an upper end surface of the first power supplying pin 40 and an upper end surface of the second power supplying pin 41 are exposed to the surface of the first insulating layer 33 beforehand. Thereafter, by forming the first thin coating heater part 23*a* and the second thin coating heater part 23*b* on the first insulating layer 33 by thermal spraying, the first power supplying pin 40 and the first thin coating heater part 23*a* are electrically connected, and the second power supplying pin 41 and the second thin coating heater part 23*b* are electrically connected. For the electrode part 36, the same manner is adopted. That is, a third power supplying pin 43 for supplying power to the electrode part 36 is previously penetrated through the base stand part 32, the first insulating layer 33 and the second insulating layer 35, and then, an upper end surface of the third power supplying pin 43 is exposed to the surface of the second insulating layer 35 beforehand. Thereafter, by forming the electrode part 36 on the surface of the second insulating layer 35 by thermal spraying, the third power supplying pin 43 and the electrode part 36 are electrically connected.

A thyristor, an inverter, or the like is used to adjust output to the first thin coating heater part 23*a* and the second thin coating heater part 23*b*. For obtaining desired heated condition, for example, a power of about 100 $kW/m^2$ is output to the first and second thin coating heater parts 23*a*, 23*b*. By incorporating a temperature sensor in the required parts in the electrostatic chuck 25 to detect a temperature of each part and detect a temperature of the wafer 27 or the focus ring 26 in a noncontact manner, the first thin coating heater part 23*a* and the second thin coating heater part 23*b* may be subjected to feedback control.

The above embodiments are illustrative and not restrictive. For example, the position of the first thin coating heater part 23*a* and the second thin coating heater part 23*b*, and the position of the electrode part 36 may be interchanged. The first thin coating heater part 23*a* and the second thin coating heater part 23*b*, and the electrode part 36 may be formed in the same layer. The forms of the insulating layer, the electrode part, the power supplying pin, the gas pore, and the cooling path can be appropriately changed according to the semiconductor producing process. The surface of the dielectric layer, with which the wafer is in contact, may be embossed to control adsorptivity. The object to be held by the electrostatic chuck may be anything, and a glass substrate of a flat panel display and the like are exemplified in addition to the wafer.

DESCRIPTION OF REFERENCE CHARACTERS

11 Heat generating component
12 Substrate part
13 Thin coating heater part
14 Insulating layer
15, 16 Lead wire
19*a*, 19*b* Terminal
20 Vacuum chamber
22 Gas introduction device
23*a* First thin coating heater part
23*b* Second thin coating heater part
23*d* Internal heater part
23*f* External heater part
25 Electrostatic chuck
26 Focus ring
27 Wafer
28 Upper electrode
29 High-frequency power source
32 Base stand part
33 First insulating layer
35 Second insulating layer
36 Electrode part
37 Dielectric layer
38 Covering layer
39 Gas pore
40 First power supplying pin
41 Second power supplying pin
42 Cooling path
43 Third power supplying pin
t Thickness
s Line width (width)
d Interline distance

The invention claimed is:

1. A heat generating component comprising:
a substrate part; and
a coating heater part formed over the substrate part, wherein
the coating heater part comprises a thermal sprayed coating containing a mixture of $Ti_{x1}O_{y1}$ in which $0<y1/x1<1.5$ is satisfied and $Ti_{x2}O_{y2}$ in which $1.5\leq y2/x2\leq 2.0$ is satisfied.

2. The heat generating component according to claim 1, wherein a total amount by mass of the $Ti_{x1}O_{y1}$ in which $0<y1/x1<1.5$ is satisfied is larger than a total amount by mass of the $Ti_{x2}O_{y2}$ in which $1.5\leq y2/x2\leq 2.0$ is satisfied, in the thermal sprayed coating.

3. The heat generating component according to claim 1, wherein a width of the coating heater part is 1-20 mm.

4. The heat generating component according to claim 1, wherein a thickness of the coating heater part is 30-1000 μm.

5. The heat generating component according to claim 1, wherein an interline distance of the coating heater part is 0.5-50 mm.

6. The heat generating component according to claim 1, having a ceramic insulating layer on the coating heater part.

* * * * *